(12) United States Patent
Martinek et al.

(10) Patent No.: US 10,410,161 B2
(45) Date of Patent: Sep. 10, 2019

(54) METHOD AND APPARATUS FOR A RECEIVING, INSPECTION, AND SUPPLIER QUALITY SYSTEM

(75) Inventors: Brian Joseph Martinek, Troy, MO (US); Warren Richard Koch, Fairview Heights, IL (US); James Arthur Hammond, Jr., O'Fallon, MO (US); George E. Anderson, Alton, IL (US)

(73) Assignee: The Boeing Company, Chicago, IL (US)

( * ) Notice: Subject to any disclaimer, the term of this patent is extended or adjusted under 35 U.S.C. 154(b) by 3544 days.

(21) Appl. No.: 11/762,925

(22) Filed: Jun. 14, 2007

(65) Prior Publication Data

US 2008/0313059 A1 Dec. 18, 2008

(51) Int. Cl.
*G01N 21/88* (2006.01)
*G06Q 10/08* (2012.01)

(52) U.S. Cl.
CPC ........... *G06Q 10/08* (2013.01); *G06Q 10/087* (2013.01)

(58) Field of Classification Search
CPC ......... G06Q 10/06; G06Q 10/087; B66C 1/12
USPC .................................... 438/14; 705/8, 22, 28
See application file for complete search history.

(56) References Cited

U.S. PATENT DOCUMENTS

| | | | | |
|---|---|---|---|---|
| 5,319,544 A * | 6/1994 | Schmerer | ............... | G06Q 40/12 705/28 |
| 6,952,680 B1 * | 10/2005 | Melby | .................... | G06Q 10/04 705/28 |
| 7,089,131 B2 * | 8/2006 | Thouin | .................. | G06Q 10/08 702/81 |
| 7,313,537 B1 * | 12/2007 | Burrell | ................. | G06Q 10/087 705/28 |
| 7,371,590 B2 * | 5/2008 | Capaldo | ............. | G01N 21/8806 438/14 |
| 2001/0047283 A1 * | 11/2001 | Melick | ....................... | B66C 1/12 709/217 |
| 2002/0023169 A1 * | 2/2002 | Ponzio, Jr. | .......... | G06F 11/3006 709/232 |
| 2003/0050871 A1 * | 3/2003 | Broughton | ............. | G06Q 10/06 705/28 |
| 2003/0227392 A1 * | 12/2003 | Ebert | ...................... | G06K 17/00 340/8.1 |
| 2004/0078306 A1 * | 4/2004 | Whiteley | .............. | G06Q 10/087 705/28 |
| 2005/0114081 A1 * | 5/2005 | Fukui | ...................... | G01N 29/14 702/182 |
| 2005/0267707 A1 * | 12/2005 | Mian | ....................... | G06Q 10/06 702/122 |
| 2005/0273720 A1 * | 12/2005 | Cochran | ................ | G06Q 10/06 715/751 |
| 2006/0047419 A1 * | 3/2006 | Diendorf | ................ | G01C 21/26 701/532 |
| 2008/0059344 A1 * | 3/2008 | Priesett | ................ | G06Q 10/087 705/30 |

* cited by examiner

*Primary Examiner* — Talia F Crawley
(74) *Attorney, Agent, or Firm* — Yee & Associates, P.C.

(57) ABSTRACT

The disclosure provides a computer implemented method, apparatus, and computer usable program code for managing inspection of items. In one embodiment, an identifier for an item is received in a shipment of items to form a received item. Inspection criteria for inspecting the shipment of items are adjusted using a quality history. The quality history is data regarding results of inspections of items. A result of the inspection is received. The quality history is updated with the result of the inspection.

23 Claims, 14 Drawing Sheets

FIG. 4

Tool Services RISQ System for St. Louis

| Inspection | NonConformances | Approved Suppliers | Suppliers | Reports | Users | Contacts |

Item [ 40217092 ] — 402    [ Get Data ] — 404

Receive the Item | Inspect and Submit the Item                                    [ Receive Item ]

Open Purchase Orders and Transfers

| Order # | Type     | Vendor PO | Description 1                  | Description 2                       |
|---------|----------|-----------|--------------------------------|-------------------------------------|
| 77579   | PODETAIL | 704764    | DR TW HS .0960D TY Y NO 41    | BTCS-DR-9071-0.0960-J-JL-1-C(TYPE Y) |
| 712986  | TRANSFER | NONE      | DR TW HS .0960D TY Y NO 41    | BTCS-DR-9071-0.0960-J-JL-1-C(TYPE Y) |

408 ← → 406

Approved Suppliers

| ID  | Approved To  | Supplier                        | City          | State |
|-----|--------------|---------------------------------|---------------|-------|
| 44  | MANUFACTURE  | CLEVELAND TWIST DRILL           | CLEVELAND     | OH    |
| 80  | RECONDITION  | GATEWAY TOOL & CUTTER GRINDING  | HAZELWOOD     | MO    |
| 108 | RECONDITION  | J & S TOOL, INC.                | ST PETERS     | MO    |
| 168 | MANUFACTURE  | PRECISION TWIST DRILL COMPANY   | CRYSTAL LAKE  | IL    |
| 175 | MANUFACTURE  | REGAL BELOIT CORPORATION        | SOUTH BELOIT  | IL    |

Quantity Ordered:       Max Quantity:

Quantity Received *  [    ]            [ ] — 410   Is there a Distributor?

| | Tool Services RISQ System for St. Louis | | | | | | |
|---|---|---|---|---|---|---|---|
| Inspection | NonConformances | Approved Suppliers | Suppliers | Reports | Users | Contacts | |

Item [ 40217092 ] [ Get Data ]

Receive the Item | Inspect and Submit the Item

Open Receivers and Transfers for Item 40217092                    [Inspect] [Save] [Submit] [Delete]

| Order # | Type | Vendor PO | Sample | Inspect | Received | Quan | Description 2 |
|---|---|---|---|---|---|---|---|
| 69819 | PODETAIL | 700596 | 15 | Sample | 08/18/2006 | 600 | BTCS-DR-9071-0.0960-J-JL-1-C(TYPE Y) |
| 77579 | PODETAIL | 704764 | 15 | Sample | 08/18/2006 | 704 | BTCS-DR-9071-0.0960-J-JL-1-C(TYPE Y) |
| 77579 | PODETAIL | 704764 | | | 09/06/2006 | 312 | BTCS-DR-9071-0.0960-J-JL-1-C(TYPE Y) |
| 77579 | PODETAIL | 704764 | 3 | Sample | 09/07/2006 | 20 | BTCS-DR-9071-0.0960-J-JL-1-C(TYPE Y) |

Supplier: ROCKY MOUNTAIN TWIST DRILL

Quantity Rejected * [ 10 ]       Shipping Defect Found [ ]     Submitted:     Is there a Distributor? [✓]

Distributor: JOHNSTON INDUSTRIAL SUPPLY

Nonconformance Information

Source Q Codes                               Nonconformance Q Codes            Nonconformance

| Q001 | Burnt |
| Q002 | Corrosion |
| Q003 | Machine Finish |
| Q004 | Incorrect Identification |
| Q005 | Missing Identification |
| Q006 | Material Type |
| Q007 | Heat Treat |

702

| Q004 | Incorrect Identification |
| Q006 | Material Type |

704

TOOL LACKS MANUFACTURER'S SYMBOL
MATERIAL TYPE IDENTIFIED ON TOOL SHANK IS M33.
SPECIFICATION ALLOWS ONLY M42

Tool Services RISQ System for St. Louis

| Inspection | NonConformances | Approved Suppliers | Suppliers | Reports | Users | Contacts & Misc. |

Modify Approved Supplier | Add Approved Supplier — 1008

1002 — Approved Supplier

Get Data    Tool Specification

Approved To | Supplier

ABRASIVE TECHNOLOGY, INC., WESTERVILLE, OH (3)
ADVANCED MACHINE & ENGINEER, ROCKFORD, IL (6)
AEROSHARP TOOL COMPANY, INC., WALES, WI (7)
ALLIED MACHINE & ENG. CORPORATION, DOVER, OH (12)
ALVORD-POLK TOOL COMPANY, MILLERSBURG, PA (13)
AMAMCO TOOL, GREER, SC (14)
AMERICAN AEROSPACE INC. (15)
AMERICAN DRILL BUSHING (CBC), PICO RIVERA, CA (16)
AMERICAN STAMP & MARKING, MARYLAND HEIGHTS, MO (18)
AMPLEX INC., ANAHEIM, CA (20)

CLEAR

CLEAR

SUBMIT

DELETE

CATEGORY   INSPECTION   AQL NORMAL   AQL TIGHT   ACTIVE

▶   Rating ▶               YES

— 1000

METHOD AND APPARATUS FOR A RECEIVING, INSPECTION, AND SUPPLIER QUALITY SYSTEM

BACKGROUND

1. Field

The disclosure relates generally to an improved data processing system and in particular to inventory management systems. Still more particularly, the disclosure relates to a computer implemented method, apparatus, and computer usable program code for an inventory inspection and supplier quality management system.

2. Background

Businesses, manufacturers, and suppliers frequently maintain large quantities of various tools, parts, supplies, and other items in inventory. These businesses, manufacturers, and suppliers typically utilize an inventory management system to assist in tracking items that have been ordered, received, and accepted in inventory. As used herein, an item refers to a part, an assembly of two or more parts, a tool, or any other item. An inventory management system is a software system providing inventory tracking tools, such as, item lookup and search, suppliers, bar code tracking, and usage tracking. An example of an inventory management system is a CribMaster Inventory Management System®.

When parts, tools, assemblies, or other items are ordered, the inventory management system is typically used to track items that have been ordered and items that have been received. The inventory management system can also provide information regarding order dates, item delivery dates, supplier information, and other details regarding an order. In other words, currently available inventory management systems track the number of items currently in inventory, track usage of items, and flag items for re-order when the quantity of items in inventory falls below a certain level. However, currently available inventory management systems do not support management of receiving, inspection, and supplier quality of ordered items.

When ordered items are received, an inspection of the ordered items is typically necessary to ensure that the tool, part, and/or assembly received from the manufacturer or supplier conforms to the buyer's specifications or requirements for the item. The inspection of items ordered and received from a supplier or manufacturer can become quite complicated, particularly when an inventory includes large numbers of ordered items and/or a large variety of items. For example, a particular lot of items may require differing levels or depth of inspection depending on the type of item and the particular supplier of the item.

In other words, when a shipment of items is received, a determination may need to be made as to what type or level of inspection should be made and whether nonconforming items should be rejected or accepted despite any nonconformance in the items received from the supplier. However, currently available inventory management systems do not provide support for managing the inspection and supplier quality of items ordered and received.

Currently, decisions regarding inspections of items are made manually by a human user. This process can be expensive, inconvenient, time consuming, and result in inconsistent inspection sample sizes and inspection levels.

Another solution to the problem of managing inventory inspections focuses on qualifying a supplier to ship directly to stock for items produced. In other words, the problems involved with inspection of goods are avoided by accepting items from certain suppliers without inspecting any of the items from those certain suppliers. However, this method allows items to be received and accepted that may be of poor quality and/or non-conforming due to the fact that no inspection is provided at all. In addition, this solution is only applicable where a supplier qualifies to ship directly to stock. If a needed item is only supplied by a supplier that does not qualify to ship directly to stock, the user is still forced to manually determine the inspection level for the various items ordered from the supplier that does not qualify to ship directly to stock.

Therefore, it would be advantageous to have an improved computer implemented method, apparatus, and computer usable program code for a receiving, inspection, and supplier quality system.

SUMMARY

Advantageous embodiments provide a computer implemented method, apparatus, and computer usable program code for managing inspection of items. In one embodiment, an identifier for an item is received in a shipment of items from a supplier to form a received item. Inspection criteria for inspecting the shipment of items are adjusted using a quality history for the received item. The quality history is data regarding results of inspections of items from the supplier. A result of the inspection is received. The quality history is updated with the result of the inspection.

Another advantageous embodiment provides an apparatus comprising a bus system; a communications system connected to the bus system; a memory connected to the bus system, wherein the memory includes computer usable program code; and a processing unit connected to the bus system. The processing unit executes the computer usable program code to receive an identifier for an item in a shipment of items from a supplier to form a received item; adjust inspection criteria for inspecting the shipment of items using a quality history for the received item; receive a result of the inspection; and update the quality history with the result of the inspection.

In another illustrative embodiment, a computer program product having a computer usable medium including computer usable program code for managing inspection of items is provided. The computer program product comprises computer usable program code for receiving an identifier for an item in a shipment of items from a supplier to form item received data; computer usable program code for adjusting inspection criteria for inspecting the shipment of items using a quality history for the received item, wherein a quality history is data regarding results of inspections of items; computer usable program code for receiving a result of the inspection; and computer usable program code for updating the quality history with the result of the inspection to form an updated quality history.

The features, functions, and advantages can be achieved independently in various embodiments of the disclosure or may be combined in yet other embodiments in which further details can be seen with reference to the following description and drawings.

BRIEF DESCRIPTION

The novel features believed characteristic of the invention are set forth in the appended claims. The invention itself, however, as well as a preferred mode of use, further objectives and advantages thereof, will best be understood by reference to the following detailed description of an advantageous embodiment of the disclosure when read in conjunction with the accompanying drawings, wherein:

FIG. 4 is an illustration of an inventory management screen for verifying an item was ordered in the inventory management system in accordance with an advantageous embodiment;

FIG. 5 is an illustration of a distributor selection screen in accordance with an advantageous embodiment;

FIG. 7 is an illustration of a record non-conformance screen in accordance with an advantageous embodiment;

FIG. 10 is an illustration of an inventory management screen for approved supplier information in accordance with an advantageous embodiment;

DESCRIPTION

Figure 1:
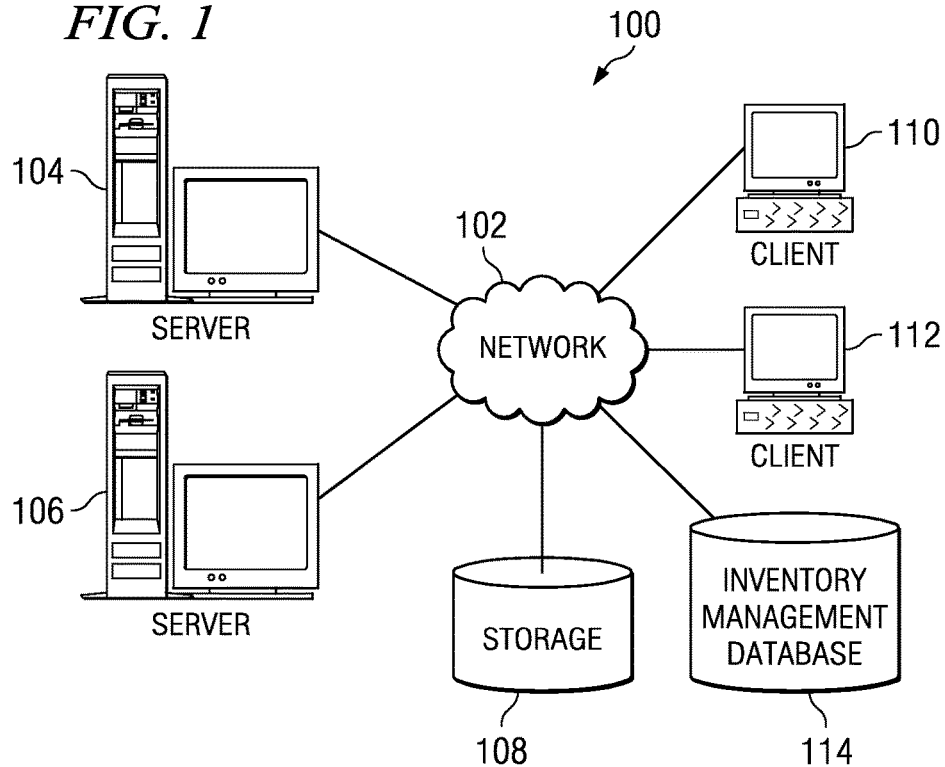
FIG. 1 is an exemplary illustration of a network data processing environment in which an advantageous embodiment may be implemented.
Figure 2:
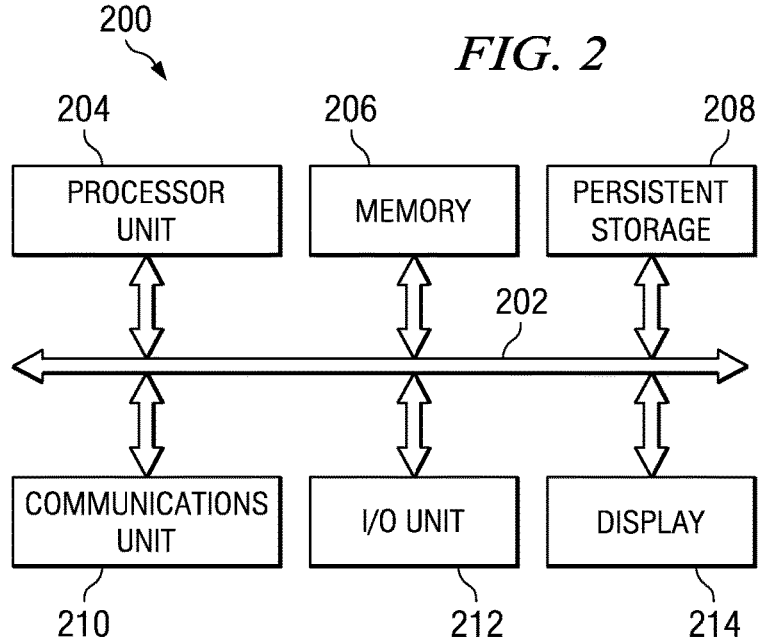
FIG. 2 is an illustration of a data processing system in accordance with an advantageous embodiment.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110 and 112 and inventory management database 114 connect to network 102. Clients 110 and 112 may be, for example, personal computers or network computers. Clients 110 and 112 are clients to server 104 in this example.

In this example, client 110 supports an inventory management system. The inventory management system uses information stored in inventory management database 114 to manage inventories and inspections of ordered and received items.

Inventory management database 114 includes one or more databases for performing functions, such as storing, receiving, sorting, querying, organizing, and/or manipulating supplier information, orders, items in current inventory, items ordered and received, part numbers, item inspection information, results of item inspections, and item/supplier quality.

An item may include a part, an assembly, a commodity, a tool, or any other item. A part may include one or more subparts. The term "subpart" refers to a part, piece, or constituent of a commodity or another part. Each subpart of a part may likewise include one or more other subparts, which may be referred to as sub-subparts. An assembly includes two or more parts. Part number description data may be data regarding the size, features, properties, manufacturing materials, and/or any other data describing a part. In other words, part number description data may be any data regarding a part identified by a given part number. The part number description data may be obtained from one or more data sources.

In these examples, inventory management database 114 includes one or more relational databases; however, inventory management database 114 also may include databases that are not relational databases. Inventory management database 114 may be located on a single data processing system or be distributed across multiple data processing systems that may be located in different locations, depending on the embodiment.

In this example, inventory management database 114 may be located remotely to client 110. However, in another embodiment, inventory management database 114 may be located locally to client 110.

In the advantageous embodiments, a user queries inventory management database 114 for information regarding ordered and received items. Inventory management database 114 provides information regarding an inspection level and/or an inspection sample size for the ordered and received items as output to computer, such as client 110 and client 112 in response to the user request or query. After the inspection of the ordered and received items is complete, the user enters the results of the inspection as input to inventory management database 114. If one or more items in ordered and received items do not conform to the specifications and/or requirements of the order to form a set of nonconforming items, inventory management database 114 provides information regarding action to be taken as to the set of nonconforming items. As used herein, the term "set of" may refer to a set of one or more.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

Turning now to FIG. 2, an illustration of a data processing system is depicted in accordance with an illustrative embodiment of the disclosure. Data processing system 200 is a computing device, such as client 110 or server 104 in FIG. 1. Data processing system 200 supports an inventory management system for managing receiving, inspection, and supplier quality of ordered and/or received items.

In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. Memory 206, in these examples, may be, for example, a random access memory. Persistent storage 208 may take various forms depending on the particular implementation. For example, persistent storage 208 may be, for example, a hard drive, a flash memory, a rewritable optical disk, a rewritable magnetic tape, or some combination of the above.

Communications unit 210, in these examples, provides for communications with other data processing systems or devices. In these examples, communications unit 210 is a network interface card. I/O unit 212 allows for input and output of data with other devices that may be connected to data processing system 200. For example, I/O unit 212 may provide a connection for user input through a keyboard and mouse. Further, I/O unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206.

When parts, tools, assemblies, or other items are ordered, an inventory management system is typically used to track items that have been ordered and items that have been received. The inventory management system can also provide information regarding order dates, item delivery dates, supplier information, and other details regarding an order. However, when ordered items are received, an inspection of the ordered items is typically necessary to ensure that the tool, part, and/or assembly received from the manufacturer or supplier conforms to the buyer's specifications or requirements for the item.

The inspection of items ordered and received from a supplier or manufacturer can become quite complicated, particularly when an inventory includes large numbers of ordered items and/or a large variety of items.

For example, a particular lot of items may require differing levels or depth of inspection depending on the type of item and the particular supplier of the item. A shipment of items from a supplier that has been making the item for ten years may require only a brief, cursory inspection or no inspection at all. On the other hand, a shipment of items from a supplier that has only recently begun to manufacture the item may require a full, thorough inspection of all the items delivered.

In addition, some ordered and received items may require a more thorough inspection based on the type of item. For example, a shipment of hammers would typically not require as thorough of an inspection as a shipment of customized, precision calipers.

The illustrative embodiments recognize that inspection of a shipment of items may be varied by the inspection sample size. In the case of customized items, it may be necessary to inspect the entire shipment of items. However, in the case of items from a supplier that has consistently delivered items conforming to order specifications in the past, it may only be necessary to inspect a sample of items in the shipment rather than inspecting the entire shipment.

In other words, when a shipment of items is received, a determination may need to be made as to how many items in the shipment should be inspected, what type or level of inspection should be made, and whether nonconforming items may be rejected or accepted despite the nonconformance based on the type of item. However, currently available inventory management systems do not provide support for managing the inspection of items ordered and received.

The illustrative embodiments recognize that past supplier performance and product quality history is not used to determine future inspection levels and/or inspection sample sizes. Therefore, the illustrative embodiments recognize the need for a computer implemented method, apparatus, and computer usable program code for an improved inventory management system that is also an inspection and supplier quality management system, as well as an inventory tracking system.

Advantageous embodiments provide a computer implemented method, apparatus, and computer usable program code for managing receiving, inspection, and supplier quality of items that have been ordered and/or received. In one illustrative embodiment, an identifier and receipt date for an item may be received in a shipment of items from a supplier to form item received data. In another embodiment, a user may also enter appropriate quality attributes of the item. In another embodiment, the inventory management system retrieves a list of approved suppliers assigned to the received item. The system also retrieves open orders in the inventory management system for the received item or similar items and provides this information to the user.

Inspection criteria for inspecting the shipment of items from the supplier may be adjusted using a quality history for similar items received from the supplier. The quality history may be data regarding results of inspections of the similar items. Inspection criteria define parameters for an inspection, such as, without limitation, an inspection sample size or number of items in a shipment to be inspected, and a level of inspection. A sample inspection size may be a full inspection of the entire shipment, an inspection of a selected number of items in the shipment that is less than the entire shipment, or no inspection of any of the items in the shipment.

In another embodiment, the inspection criteria include an inspection level. An inspection level dictates the type of inspection or thoroughness of the inspection. An inspection level may be a normal mode inspection, a tightened mode inspection, a rating mode inspection, or a skip mode inspection. In a skip mode inspection, an inspection of the shipment may not be performed at all. In a tightened mode inspection, a more thorough or detailed inspection may be performed than in a normal mode inspection.

The inspection criteria may also be adjusted using the assigned quality attributes for similar items in addition to the quality history. As used herein, a similar item may be the same type of item. The definitions or parameters for a same type of item are user definable. A same type of item may be defined as items that are exactly the same in functionality and characteristics of the item. For example, if the item is a ball-peen hammer, similar items would be other ball-peen hammers received from the same supplier.

In another example, similar items may be defined as items having the same or similar characteristics. In another embodiment, the same type of item may be defined as items that have the same and/or similar functionality. For example, if the item is a ball-peen hammer, similar items might include ball-peen hammers, common nail hammers, and hand drilling hammers received from the same supplier. For example, the same type of items may be items that are the same or similar in manufacture, material, design, or construction.

A result of the inspection is received. The quality history for similar items received from the supplier is updated with the result of the inspection.

Figure 3:
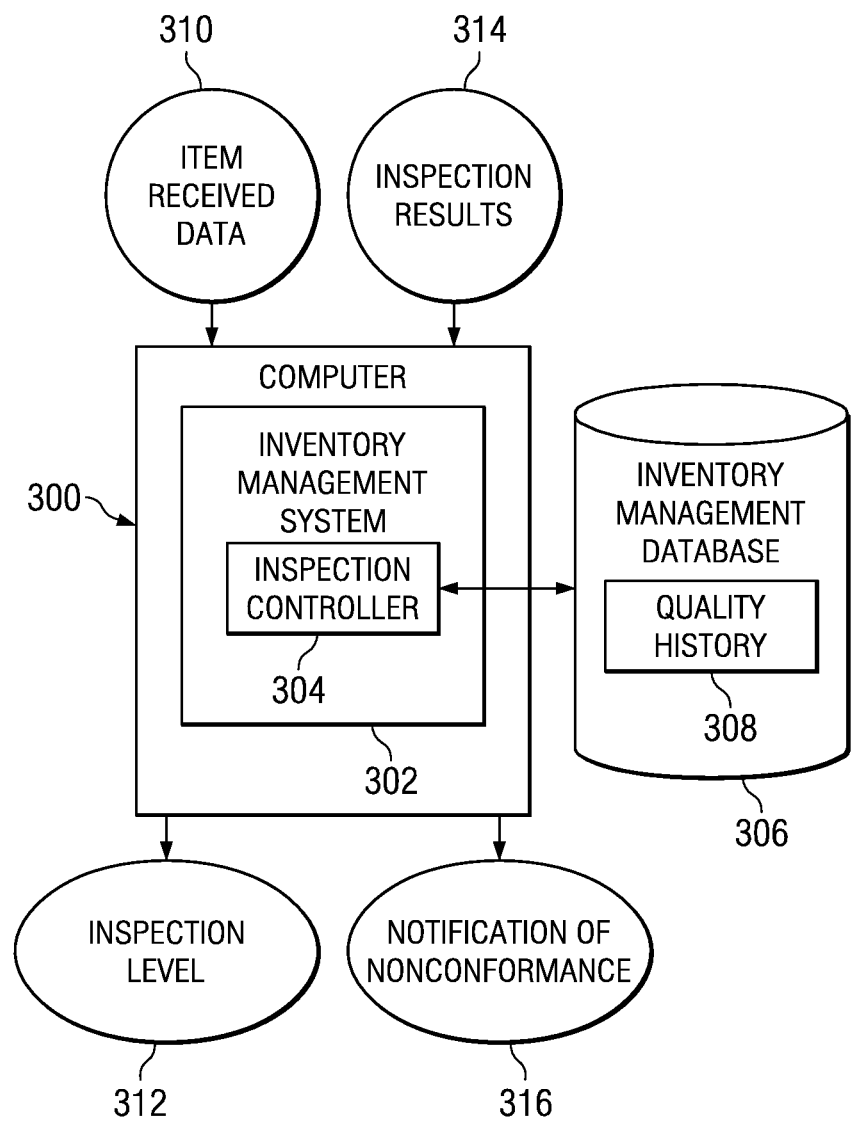
FIG. 3 is an illustration of a data flow through an inventory management system for managing inspection of items in accordance with an advantageous embodiment.

FIG. 3 is an illustration of a data flow through an inventory management system for managing inspection of items in accordance with an advantageous embodiment. Computer 300 may be implemented using any type of computing device, such as a personal computer, laptop, personal digital assistant, or any other computing device depicted in FIGS. 1 and 2. In this example, computer 300 is a computing device, such as, client 110 or server 104 in FIG. 4.

Inventory management system 302 is software for managing inventory. Inventory management system 302 may be any type of known or available inventory management system for managing items in an inventory. In this example, inventory management system 302 is implemented as Crib-Master Inventory Management System®.

Inventory management system 302 includes inspection controller 304. Inspection controller 304 may be software for managing receiving, inspection, and quality of ordered items. Inspection controller 304 may be integrated within inventory management system 302, such that inspection controller 304 may be included within or built-in to inventory management system 302.

In another embodiment, inspection controller 304 may be implemented as a plug-in or add-on to inventory management system 302. In this example, inventory management system 302 may be any off-the-shelf inventory management system, such as, without limitation, CribMaster Inventory Management System®. Inspection controller 304 may be added on to inventory management system 302 as a separately purchased plug-in to inventory management system 302.

Inventory management database 306 is a database for storing item inspection data and quality history 308. Item inspection data includes, but is not limited to, listings of all items in inventory, listing of all items on order, listings of items received and waiting for inspection, receipt dates of items, specification number, approved suppliers, supplier contact information, appropriate quality attributes of items, information regarding all open orders, and/or any other information regarding items in inventory, received, or on order. Supplier information may include information regarding whether a supplier is an active supplier or an inactive supplier.

An inactive supplier is a supplier that is approved to supply a particular part but the supplier is not actively offering or manufacturing the particular part. Specification number information for an item may include information such as approved suppliers of the item, acceptable quality levels (AQL) for an item, inspection types for the item, and category for the item. The category for the item indicates the type or grouping of the item. For example, a hammer which is fairly simple to manufacture or inspect would fall into a different category than a precision cutting tool, which would require greater care during manufacture and correspondingly, a more detailed inspection to ensure the cutting tool is up to specifications. In another example, a drill bit manufacturer and a rivet hammer manufacturer may fall into different categories because a manufacturer that produces high quality drill bits may not necessarily be capable of producing quality rivet hammers due to the inherent differences in these items.

Quality history 308 is data regarding the results of past inspections for items received from a particular supplier. Quality history 308 may also be referred to as results pattern for an item or results pattern for a supplier. Quality history 308 may include inspection histories for multiple suppliers for the same item and inspection histories for multiple items from the same supplier. Each time an item is inspected, the inspection results are recorded in inventory management database 306 and used to update quality history 308 for the type of item and/or the supplier.

When an item is received from a supplier, item received data 310 is entered as input into inventory management system 302. Item received data 310 is data regarding one or more items received in a shipment. Item received data 310 may include, but is not limited to, an order number, a part number or other item code or identifier for identifying the type of an item, the receipt date the item has been received, a number of items received in the same shipment, and/or a supplier that sent the item.

Inventory management system 302 retrieves quality history 308 for the item and/or supplier and any item inspection data for the item. Inventory management system 302 processes item received data 310, quality history 308, and item inspection data to generate inspection level 312. Inspection level 312 is output generated by inspection controller 304 regarding an inspection level for the shipment of items.

An inspection level may include, but is not limited to, skip inspection, normal inspection, or tightened inspection. A skip inspection level indicates that an inspection of the shipment is not necessary due to the type of item and/or due to the supplier's favorable quality history. A tightened inspection indicates that a more careful or detailed inspection is necessary than the normal inspection due to the type of item and/or due to the suppliers bad or low quality history.

Inspection level 312 output by inspection controller 304 may also indicate a sample size of the shipment for inspection. A sample size may be, but is not limited to, a full inspection, a sample inspection, or no inspection. A full inspection indicates that all items in the shipment should be inspected. A sample inspection indicates that only a selected number of items in the shipment should be inspected. The sample inspection includes a suggested or required number of items to be inspected.

In this example, quality logic is used to determine the inspection level and/or adjust the inspection sample size. The quality logic is business logic. For example, the quality logic may be, but is not limited to, business logic based on International Organization for Standardization (ISO) 2859 parts 1 and 3 to automatically adjust sampling sizes based on determined adjusted quality levels and C=0 sampling table. The term C=0 refers to an absence of bad or nonconforming parts. This logic then builds a historical database using existing performance data to adjust the sampling size, thus, influencing future inspections.

An inspection in accordance with inspection level 312 is performed using any known or available method for inspecting items for conformance to requirements and/or specifications. Inspection results 314 are data regarding the results of the inspection. For example, inspection results 314 could indicate that 2 items in a sample size of 10 items in a shipment received from "ABC" supplier were not in conformance or non-conforming. Inspection results 314 are provided as input to inventory management system 302. Inventory management system 302 updates quality history 308 using the inspection results 314. Thus, each time an inspection is performed, the results of the inspection may be used to determine the inspection level and/or inspection sample size of future inspections. In other words, current inspection results are used to refine quality history 308 for future lots.

In the example above, the results of the inspection of the shipment from "ABC" supplier may be used to determine that the sample size for inspection should be increased and/or an inspection level should be tightened for the next shipment received from "ABC" supplier due to the non-conforming items identified in the last inspection. If any items are identified as non-conforming items during the inspection, inventory management system 302 sends notification of nonconformance 316.

Notification of nonconformance 316 may be implemented using any known or available means for providing notice, including, but not limited to, an electronic mail (e-mail), an instant message, a pop-up message, a voice mail message, a bulletin board notice, or any other type of method for sending a message.

Notification of nonconformance 316 may be sent to personnel, such as engineering personnel, for determination as to whether the nonconforming items may be acceptable for use despite the nonconformance, whether the item may be reworked to make the item acceptable for the given purpose for which the item was needed, and/or whether the item should be scrapped and returned to the supplier. Notification of nonconformance 316 may also be sent to the supplier and/or distributor of the item. In this case, notification of nonconformance 316 provides notice of the nonconformance to the supplier or distributor and/or requests corrective action.

Thus, in this embodiment, the process provides an approach to the receiving of perishable tools and other items and establishing desired inspection levels. These inspection levels may vary from complete inspection, sample inspection, rating inspection, and no inspection, based on the supplier's quality history, the difficulty of manufacturing the item, and/or the criticality of the item. In this embodiment, discriminators or other item identifiers are used for verifying that items were ordered in inventory management system 302.

Turning now to FIG. 4, an illustration of an inventory management screen for verifying an item was ordered in the inventory management system shown in accordance with an advantageous embodiment. Screen 400 is an exemplary display screen in an inventory management system for receiving item received data, such as item received data 310 in FIG. 3.

Items are received by entering an item number, item code, part number, or other item identifier for identifying an item in item identifier field 402 and requesting item data, such as by selecting get data 404 control. The item identifier is used to determine if any open orders are associated with the item by comparing the item identifier with open orders in an inventory management database, such as inventory management database 114 in FIG. 1 or inventory management database 306 in FIG. 3. If there are no open orders or the item has been previously received, only information for approved suppliers 406 will be displayed. If an open order for the item does exist, the item received information will be displayed.

Thus, the inventory management system accepts receipt of a shipment as an input. To receive an item, the item is entered into the inventory management system with appropriate quality attributes, have approved suppliers assigned, and be on an open order in the inventory management system. In this example, a user enters an item number, code or identifier into the inventory management system to receive the item. The inventory management system retrieves item inspection information, quality history, and open orders for the item from an inventory management database in response to receiving the item identifier.

Screen 400 displays new purchases and transfers from reconditioning suppliers at Open Purchase Orders and Transfers 408. Each order, shipment, or lot of items has a unique order number that may be used to track the order, shipment, or lot.

A split order warning (not shown) is displayed if an incomplete order is received due to a partial delivery of an order. In other words, if an order was for 5,000 items and only 2500 are delivered in a shipment, a split order warning will be displayed. The split order warning may take the form of a text message, an icon, an audio signal, a verbal warning from a speech synthesizer, or via any other known or available means for providing output to a user.

If the item was procured through a distributor, the user selects "Is there a distributor?" field 410. In response to selecting field 410, a select distributor screen may be presented to the user. A distributor selection screen is described in greater detail in FIG. 5 below.

Figure 5:
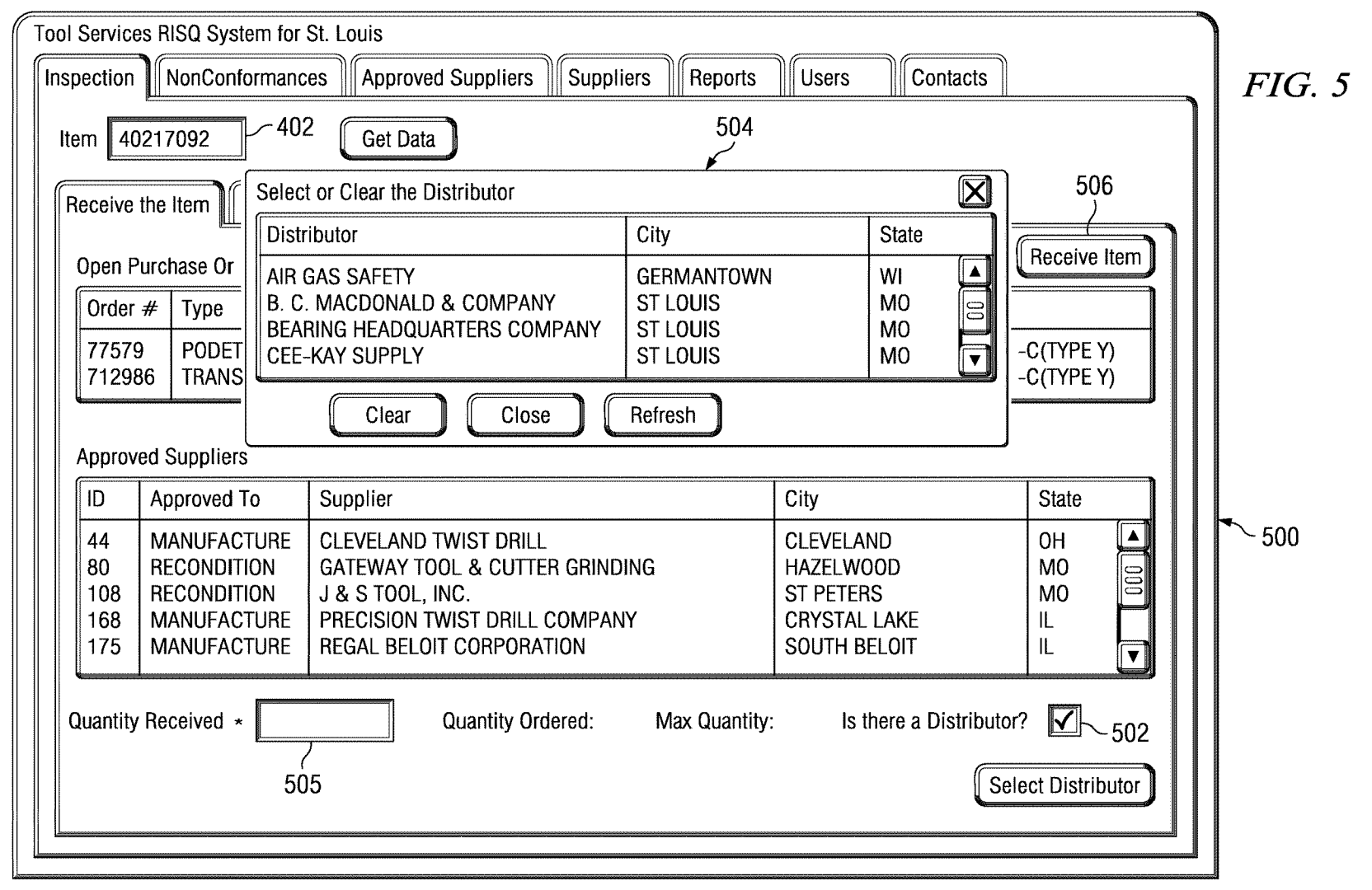

FIG. 5 is an illustration of a distributor selection screen in accordance with an advantageous embodiment. Screen 500 is an exemplary screen for a user to enter information regarding an item being received.

A user selects a manufacturer or re-conditioner of the item identified in item identifier field 402 in FIG. 4. If the item was procured through a distributor, the user selects "Is there a distributor?" field 502. Selecting field 502 opens an additional window to select a distributor. A distributor may be selected from list of distributors 504 or entered as a free text entry.

After the receiving selections are completed, the user enters the quantity of the item received in field 505. A quantity greater than zero should be entered. In another embodiment, a quantity greater than 10% more than the original order cannot be received. Finally, a user selects to receive the item, such as by selecting control 506. If the item is not part of a split order, the order will be received and removed from the screen.

Figure 6:
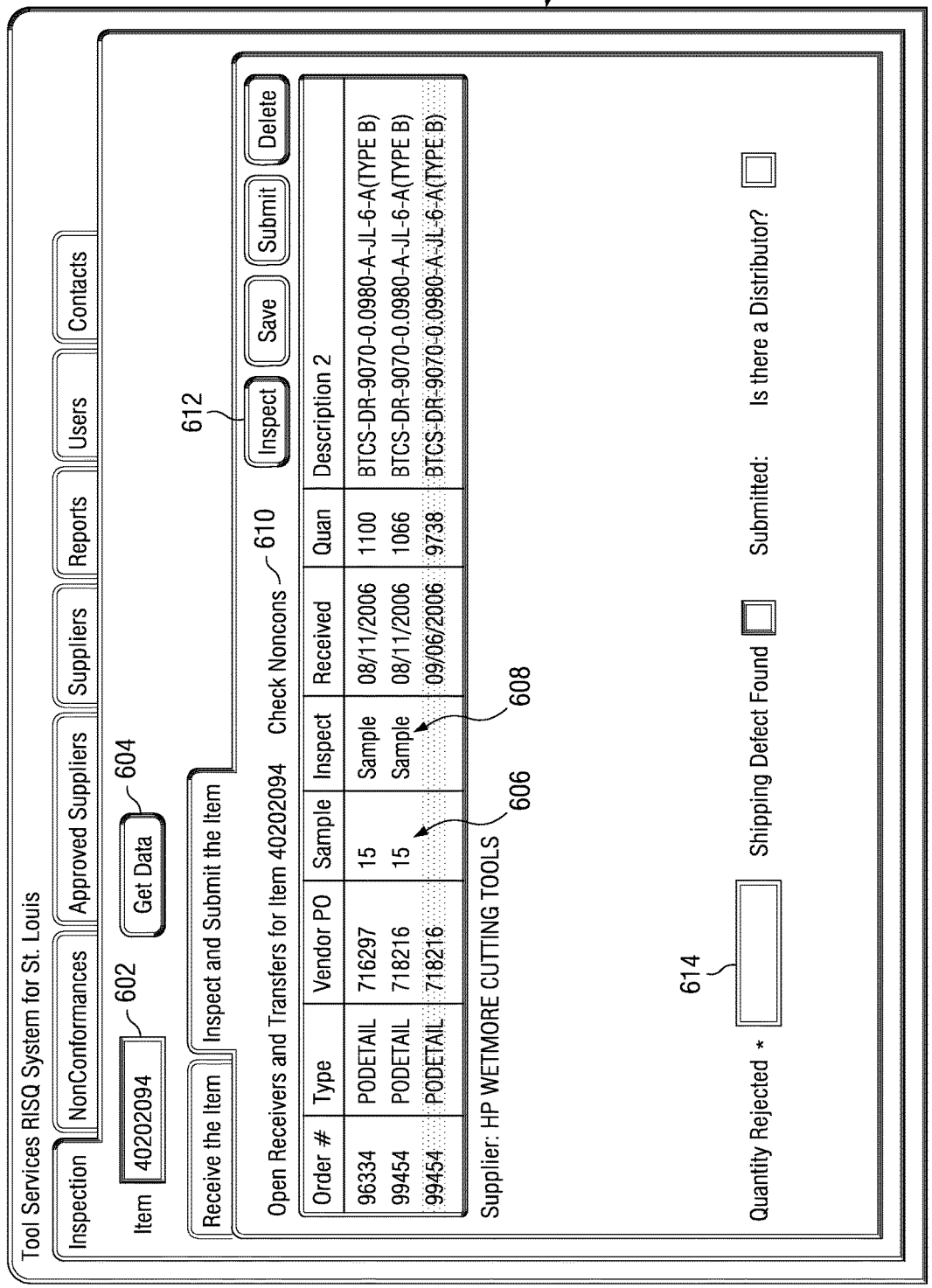
FIG. 6 is an illustration of an inventory management screen for outputting an inspection level and/or an inspection sample size in accordance with an advantageous embodiment.

Referring now to FIG. 6, an illustration of an inventory management screen for outputting an inspection level and/or an inspection sample size is shown in accordance with an advantageous embodiment. Screen 600 is a screen for determining an inspection level and inspection sample size. After an item has been received, the next step is to inspect the item and submit the results of the inspection.

In this example, the user enters the item number, code, part number or other identifier in identifier field 602 and selects get data field 604. Items that have been inspected have inspection information in sample field 606 and inspect field 608.

After a user selects a line to be inspected, a check non-conformity message 610 is displayed if a non-conformance has previously been created for this item number. Message 610 alerts the user that a non-conformance has previously been created for this item number and order number. This could occur, for example, where a split order was received in a previous shipment has non-conforming conditions or if the manufacturer has alerted engineering that non-conforming items were manufactured and engineering ahs authorized acceptance of those items.

In this example, a user selects inspect field 612 to obtain the number of items or pieces in the shipment to be inspected. The inventory management system returns the number of items or pieces to be inspected in sample field 606. The inventory management system indicates the inspection level, such as full inspection, sample inspection, or none in inspect field 608.

In this example, the inventory management system provides an inspection sample size based on the assigned quality attributes and quality history of similar items retrieved from the same supplier using developed business logic. The inventory management system then uses current inspection results to further refine the quality history for use in determining an inspection level and/or an inspection sample size for future shipments of the item.

If a nonconforming item is found during the inspection, entry of this nonconforming item into the inventory management system will electronically notify appropriate personnel using predetermined roles in the system. In this example, after inspecting the number of items indicated in field 606, the user enters the number of items rejected in quantity rejected field 614. If a number greater than zero is entered, a record non-conformance screen, such as record non-conformance screen 700 in FIG. 7, will be shown.

FIG. 7 is an illustration of a record non-conformance screen in accordance with an advantageous embodiment. Record non-conformance screen 700 prompts a user to enter additional information regarding a set of one or more items in a shipment that failed to inspection. The user enters the number of items that failed the inspection in quantity rejected field 701. Non-conforming information is entered in this example, by selecting non-conforming condition codes in Source Q Codes 702. Multiple Source Q Codes 704 may be selected. Details of the non-conformance may be recorded in the "nonconformance" free form text field 706. After completion of the process of entering non-conforming information for the set of non-conforming items, the user selects submit field 712 to submit the item for delivery and/or to process the non-conformance. If the non-conforming items are submitted to process the non-conformance by engineering, the engineering is notified by a notification of non-conformance, such as notification of non-conformance 316 in FIG. 3.

Figure 8:
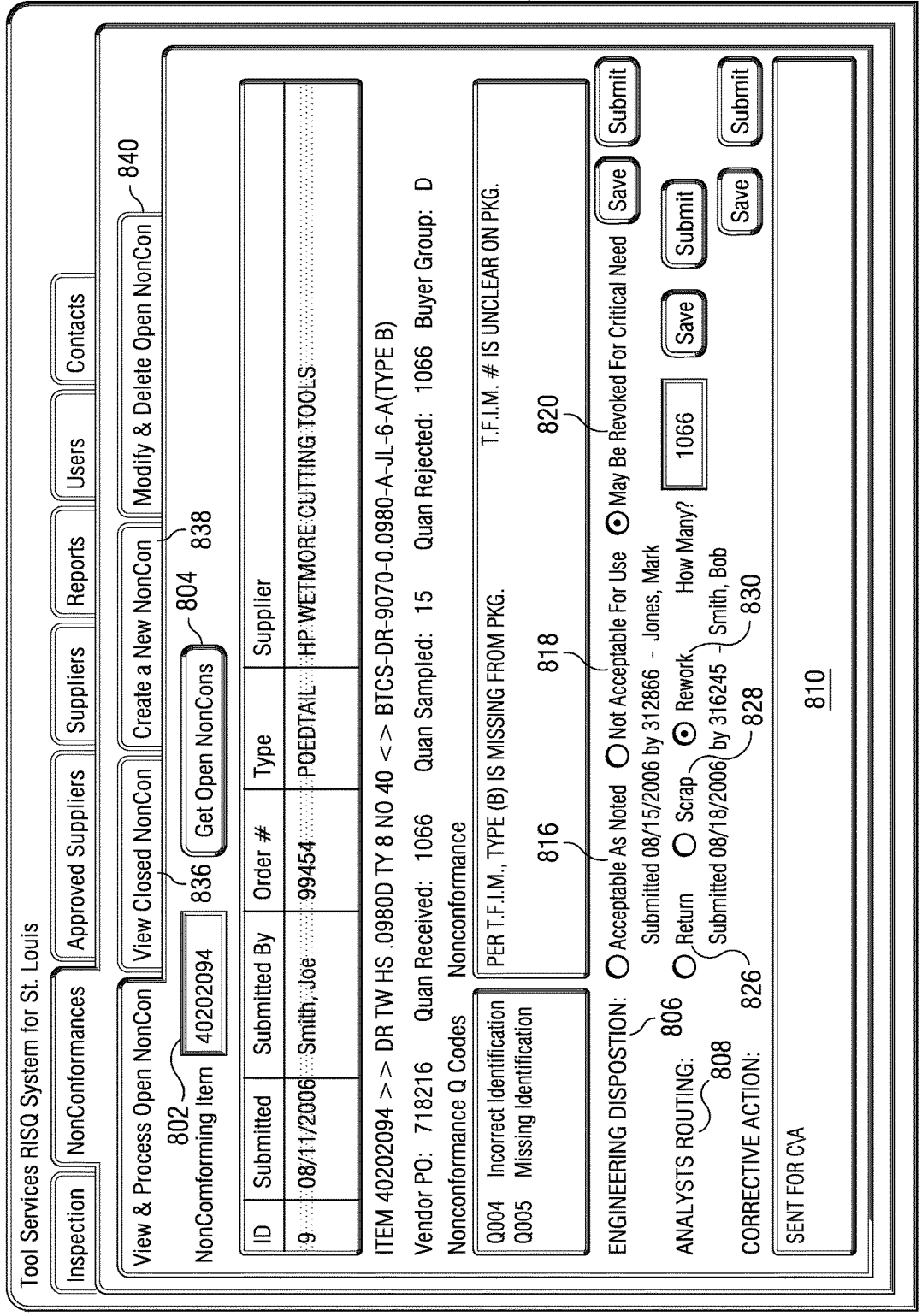
FIG. 8 is an illustration of an inventory management screen for disposition of nonconforming items in accordance with an advantageous embodiment.

Referring now to FIG. 8, an illustration of an inventory management screen for disposition of nonconforming items in accordance with an advantageous embodiment. When engineering receives a notification of non-conformance, engineering, or other personnel, may obtain information regarding the set of one or more nonconforming items from nonconformance disposition screen 800.

To view open non-conformances, the user in this example enters the item number, code, or other identifier in identifier field 802 and select get open non-conformances field 804. A list of open non-conformances for that item is displayed. In this example, the user can select a nonconformance to display details regarding the nonconforming condition and display engineering disposition field 806, analyst routing 808, and corrective action field 810.

In this example, engineering dispositions include three choices, acceptable as noted 816, not acceptable for use 818, and may be reworked for critical need 820. Acceptable as noted 816 is selected for acceptance of items that are acceptable without correction despite the nonconformance. Not acceptable for use 818 is to be selected for items that cannot be corrected to specification or can only be corrected by the manufacturer. If a user submits this selection, a notification is generated to notify analysts that a nonconformance has occurred and the analyst routing selections. The third selection, may be reworked for critical need 820 is for items that can be corrected to specification. This selection notifies the analysts that a nonconformance has occurred and activates analyst routing 808 selections.

Analyst routing 808 includes three selections, return 826, scrap 828, and rework 830. Return 826 is for items that are to be returned to the manufacturer or supplier. The user may select to return the entire quantity of items received in the shipment or return only a portion of the items in the set of nonconforming items.

Scrap 828 is for items that the user selects to discard. In this case, the user chooses not to correct the item or return it to the supplier or manufacturer. The user may select to scrap the entire quantity of items received in the shipment or scrap only a portion of the items in the set of nonconforming items.

The third selection in this example, rework 830, is for items that may be corrected by someone other than the supplier or manufacturer. The user may select to rework the entire quantity of items received in the shipment or rework only a portion of the items in the set of nonconforming items.

Thus, in this illustrative embodiment, the inventory management system allows users to give instructions for dealing with nonconforming items and electronically notify suppliers, manufactures, and/or distributors of this nonconforming condition while requesting corrective action taken to correct the nonconformance.

Corrective action 832 is used to record the manufacturer's corrective action. After the manufacturer's corrective action, the nonconformance is closed. In this example, view closed nonconformance 836 may be selected to recover information regarding closed nonconforming items for reference or review. Create a new nonconformance 838 may be selected to create a nonconformance prior to shipment from the manufacturer or after an item has been previously submitted by inspection as having zero quantity rejected.

In another embodiment, there may be instances where submitted non-conformances are incorrect, lack necessary information, must be edited, or should not have been submitted. In this case, the non-conformance may be modified or deleted by selecting modify and delete open nonconformance 840. An exemplary modify non-conformance screen is shown in FIG. 9 below.

Figure 9:
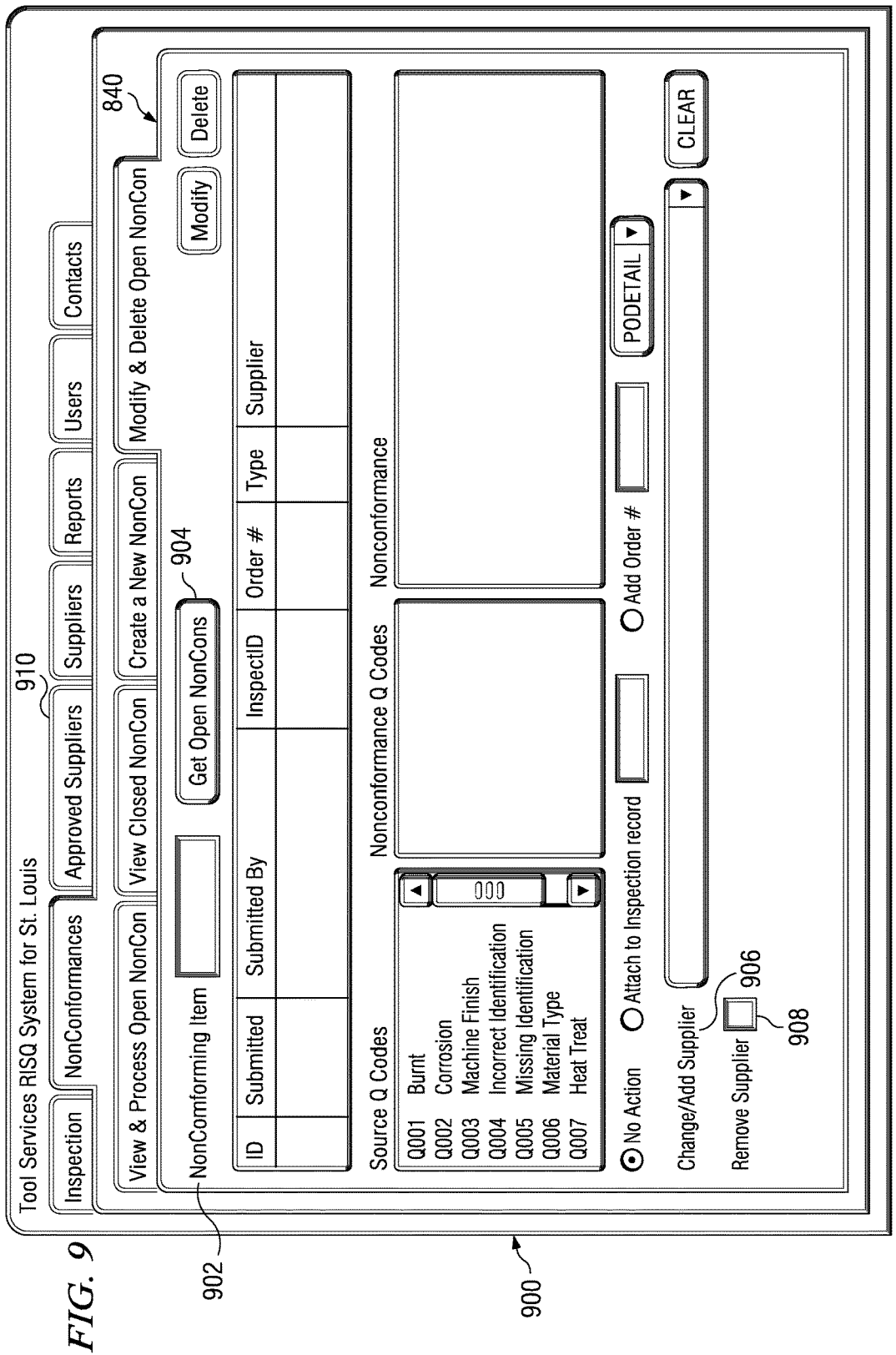
FIG. 9 is an illustration of a modify non-conformance screen in accordance with an advantageous embodiment.

FIG. 9 is an illustration of an exemplary modify non-conformance screen in accordance with an advantageous embodiment. Modify non-conformance screen 900 allows a user to add, modify, or delete information regarding a non-conforming item. A user enters an item number in identifier field 902 and selects get open nonconformance 904. The user selects the line to be modified. The user may then add or remove information regarding the selected item. The user may change or add a supplier in this example, by selecting supplier 906. The user may delete a supplier in this example, by selecting remove supplier 908.

Approved suppliers for an item may be viewed by selecting approved suppliers 910. An exemplary approved supplier's information screen is shown in FIG. 10 below.

FIG. 10 is an illustration of an inventory management screen for approved supplier information in accordance with an advantageous embodiment. Screen 1000 is an approved supplier screen providing information regarding suppliers of a given item.

A user may select a supplier from approved supplier 1002. The inventory management system then displays quality criteria for that supplier. The user may add additional suppliers for an item by selecting add approved supplier 1008. In this manner, supplier information associated with a particular item may be retrieved and/or updated.

Figure 11:
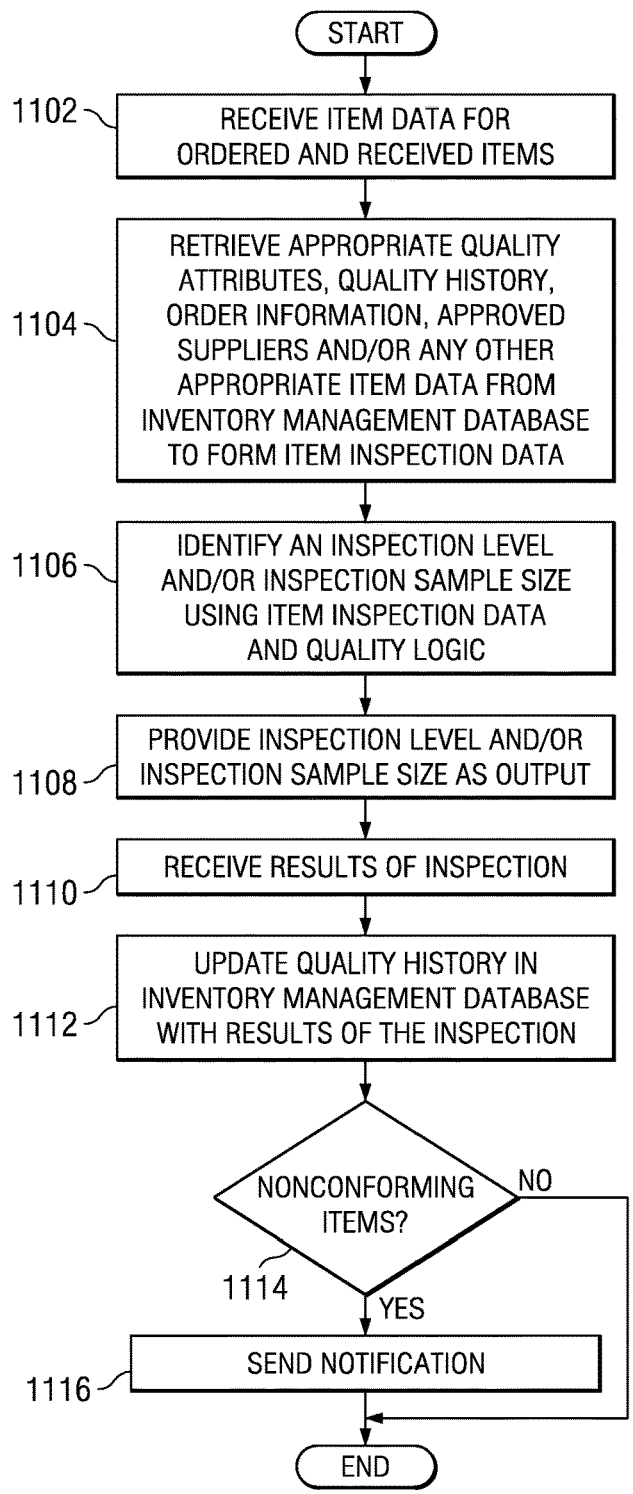
FIG. 11 is a flowchart of a process for managing receiving, inspection, and quality of ordered items in accordance with an advantageous embodiment.

Turning now to FIG. 11, a flowchart of a process for managing receiving, inspection, and quality of ordered items is shown in accordance with an advantageous embodiment. The process in FIG. 11 may be implemented by software for managing inspection of items ordered and received, such as, without limitation, inspection controller 304 in FIG. 3.

The process begins by receiving item data for ordered and received items (operation 1102). Appropriate quality attributes of the item, quality history for the item and/or supplier, order information, approved suppliers, and/or any other appropriate item data is retrieved from an inventory management database, such as inventory management database 114 in FIG. 1 and inventory management database 306 in FIG. 3, to form item inspection data (operation 1104). An inspection level is identified and/or an inspection lot size is identified using the item inspection data and quality logic (operation 1106). Quality logic is business logic for identifying inspection levels and appropriate inspection sample sizes. The inspection level may be a normal inspection, a tightened inspection, no inspection/skip inspection, or any other inspection level.

Next, the inspection level and/or inspection lot size is provided to a user as output (operation 1108). The results of the inspection are received after the inspection is complete (operation 1110). In one embodiment, a user enters the results of the inspection into the inventory management system as input. The quality history is updated in the inventory management database with the results of the inspection (operation 1112). A determination is made as to whether any of the items were identified as nonconforming items in the inspection results (operation 1114). If none of the items were nonconforming, the process terminates thereafter. If one or more items were determined to be nonconforming at operation 1114, the process sends a notification of nonconformity (operation 1116) with the process terminating thereafter.

Figure 12:
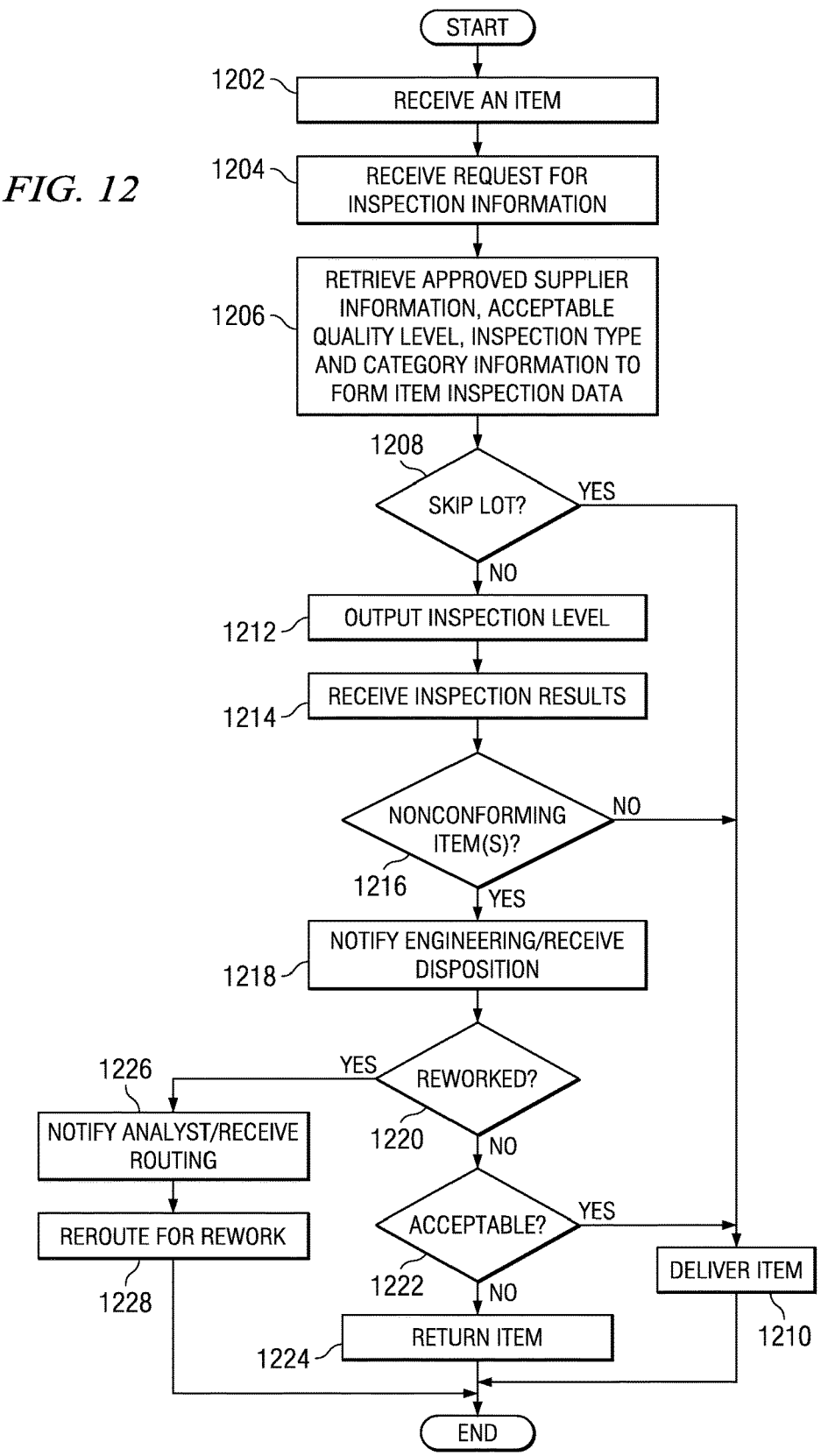
FIG. 12 is a flowchart of a process for managing inspections of ordered and received items in accordance with an advantageous embodiment.

FIG. 12 is a flowchart of a process for managing inspections of ordered and received items in accordance with an advantageous embodiment. The process in FIG. 12 may be implemented by software for managing inspection of items ordered and received, such as, without limitation, inspection controller 304 in FIG. 3.

The process begins by receiving an item (operation 1202). An item is received when a user enters an item number, code, or other identifier and/or a receipt data into the inventory management system to form a received item. A request for inspection is received (operation 1204). Approved supplier information, acceptable quality level (AQL), inspection type, and category information is retrieved (operation 1206). A determination is then made as to whether to skip inspection of the lot (operation 1208). The term lot refers to a shipment of items. If inspection of the lot is skipped, the item is delivered (operation 1210) and the process terminates thereafter.

Returning to operation 1208, if the lot is not skipped, an inspection level for the lot is output (operation 1212) to a user. Results of the inspection are received from the user (operation 1214). A determination is then made as to whether any nonconforming items were identified in the inspection results (operation 1216). If nonconforming items were not identified, the item is delivered (operation 1210) with the process terminating thereafter.

Returning to operation 1216, if nonconforming items are identified, a notification of nonconformance is sent to engineering and a disposition of the nonconforming item is received (operation 1218). The disposition may specify that the nonconforming item is acceptable as is, the item is to be reworked, or the item is to be scrapped.

The process makes a determination as to whether the disposition specifies that the nonconforming item is to be reworked (operation 1220). If the item is not to be reworked, a determination is made as to whether the item is acceptable as is (operation 1222). If the item is acceptable without modification, the item is delivered (operation 1210) with the process terminating thereafter.

Returning to operation 1222, if the item is not acceptable and the item is not to be reworked, the nonconforming item is returned (operation 1224) to the manufacturer with the process terminating thereafter.

Returning to operation 1220, if the item can be reworked, an analyst is notified that the item is to be reworked and routing to the analyst is received (operation 1226). The item is rerouted for rework in accordance with the routing (operation 1228) with the process terminating thereafter.

Figure 13:
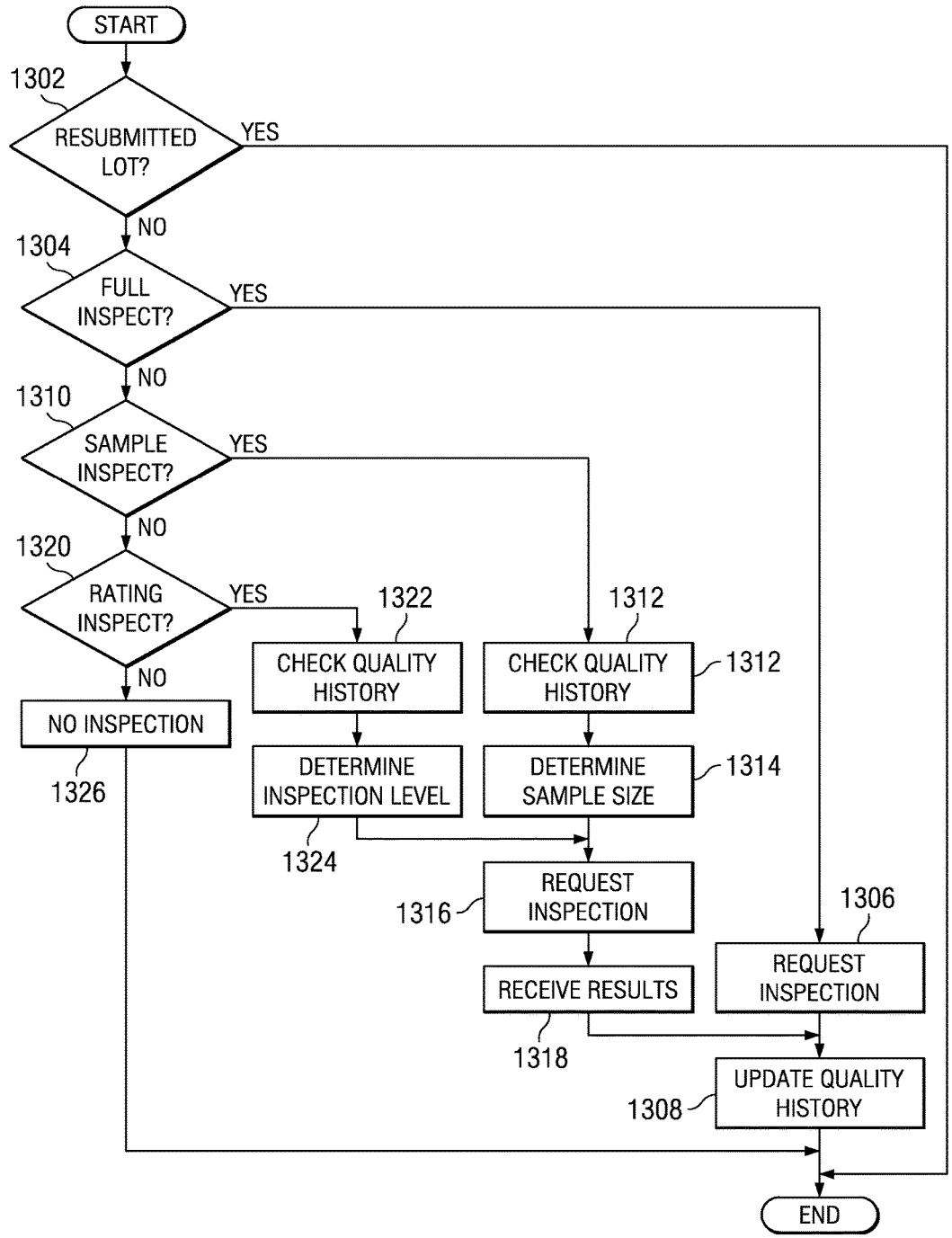
FIG. 13 is a flowchart of a process for determining inspection levels in accordance with an advantageous embodiment.

FIG. 13 is a flowchart of a process for determining inspection levels in accordance with an advantageous embodiment. The process in FIG. 13 may be implemented by software for managing inspection of items ordered and received, such as, without limitation, inspection controller 304 in FIG. 3.

The process begins by making a determination as to whether the lot of items is a resubmitted lot (operation 1302). If the lot is a resubmitted lot, any inspection results will not influence quality history for the item. Inspection is performed and recorded with the process terminating thereafter.

If the lot is not a resubmitted lot, a determination is made as to whether a full inspection should be performed (operation 1304). If a full inspection should be performed, the full inspection is requested (operation 1306). When results of the inspection are received, the quality history for the item is updated with the results (operation 1308) with the process terminating thereafter.

Returning to operation 1304, if a full inspection should not be performed, a determination is made as to whether a sample inspection should be performed (operation 1310). If a sample inspection should be done, quality history for the item is checked (operation 1312). The quality history can be used to determine the number of items that should be included in the sample for inspection. If the quality history indicates the supplier has a bad history of delivering nonconforming items, a larger sample size may be required. Likewise, a supplier that has a history indicating a majority of conforming items may only need a small sample of the lot to be inspected.

The sample size is determined (operation 1314) and an inspection of the sample size is requested (operation 1316). Results of the inspection are received (operation 1318) and quality history for the item is updated using the results (operation 1308) with the process terminating thereafter.

Returning to operation 1310, if a sample inspect is not indicated, a determination is made as to whether a rating inspect should be made (operation 1320). If a rating inspect is indicated, quality history is checked (operation 1322) and an inspection level is determined (operation 1324). An inspection at the inspection level is requested (operation 1316). Results of the inspection are received (operation 1318) and quality history for the item is updated using the results (operation 1308) with the process terminating thereafter.

Returning to operation 1320, if a rating inspect is not indicated, no inspection is made (operation 1326) with the process terminating thereafter.

In this manner, the inspection criteria for inspecting a shipment are adjusted using the quality history for the item. As used herein, the quality history is a history of inspections for items similar to the item(s) in the shipment that were received from the same supplier.

Figure 14:
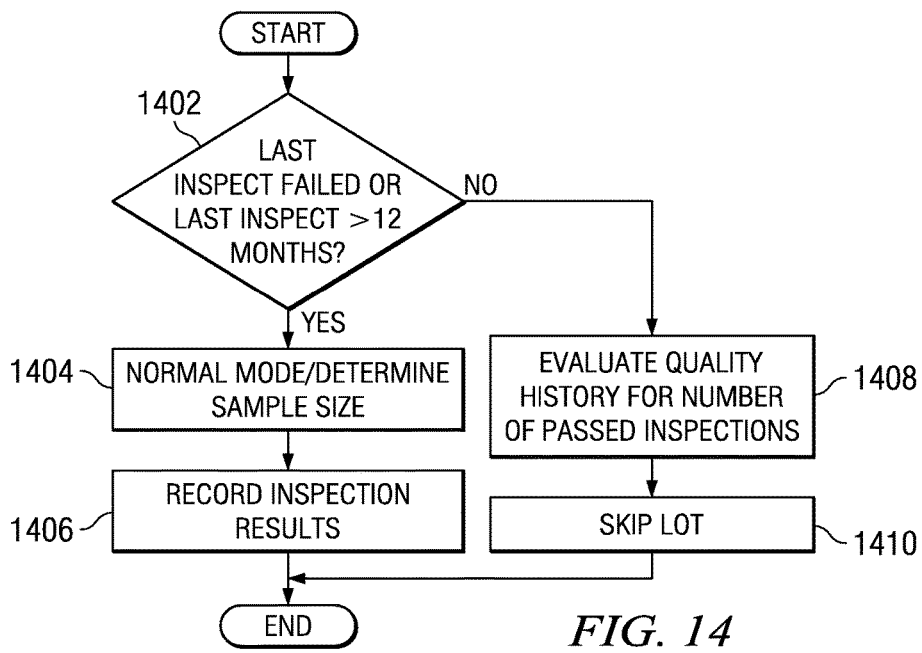
FIG. 14 is a flowchart of a process for a skip inspection level in accordance with an advantageous embodiment.

FIG. 14 is a flowchart of a process for a skip inspection level in accordance with an advantageous embodiment. The process in FIG. 14 may be implemented by software for managing inspection of items ordered and received, such as, without limitation, inspection controller 304 in FIG. 3.

The process begins by making a determination as to whether a last inspection failed or if the last inspection was more than 12 months ago (operation 1402). If the last inspection did fail or the last inspection was more than 12 months ago, an inspection mode is reset from skip mode to a normal mode and a sample size is determined (operation 1404). In other words, due to the poor quality of the last inspection or due to the length of time since the last inspection, the inspection is not skipped. Results of the inspection are recorded (operation 1406) in an inventory management database with the process terminating thereafter.

Returning to operation 1402, if the last inspection did not fail and if the last inspection was not more than 12 months ago, quality history for the item is evaluated for the number of passed inspections (operation 1408). The lot is skipped (operation 1410) and no inspection is performed with the process terminating thereafter.

Figure 15:
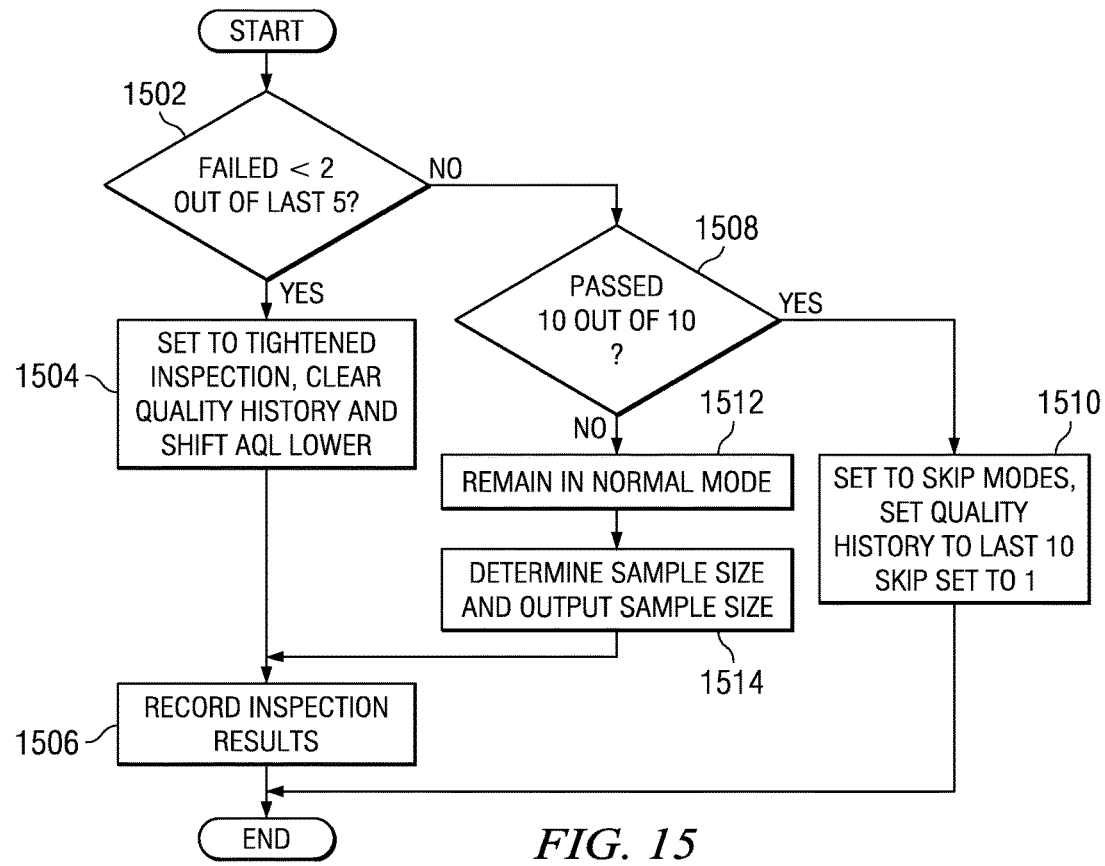
FIG. 15 is a flowchart of a process for a normal inspection level in accordance with an advantageous embodiment.

FIG. 15 is a flowchart of a process for a normal inspection level in accordance with an advantageous embodiment. The process in FIG. 15 may be implemented by software for managing inspection of items ordered and received, such as, without limitation, inspection controller 304 in FIG. 3.

The process begins by making a determination as to whether 2 or more of the last 5 lots of items from the supplier failed to pass the inspection (operation 1502). If 2 or more out of the last 5 lots did fail, the inspection level is changed from normal mode to tightened inspection mode, the quality history is cleared, and the acceptable quality level is lowered (operation 1504). Results of the inspection of the lot are recorded in an inventory management database (operation 1506) with the process terminating thereafter.

Returning to step 1502, if less than 2 of the last 5 inspections did not fail, a determination is made as to whether 10 out of the last 10 lots from the supplier passed (operation 1508). If the last 10 out of 10 lots passed, the inspection level is changed from normal mode to skip mode, the quality history for the item is set to the last 10 inspection results, and the skip set is reset to one (operation 1510) with the process terminating thereafter without an inspection of the lot being performed.

Returning to operation 1508, if the last 10 out of 10 lots did not pass, the inspection level remains at normal mode (operation 1512). A determination is made as to a sample size and the sample size is output to the user (operation 1514). The results of the inspection are recorded in the inventory management database (operation 1506) with the process terminating thereafter.

Figure 16:
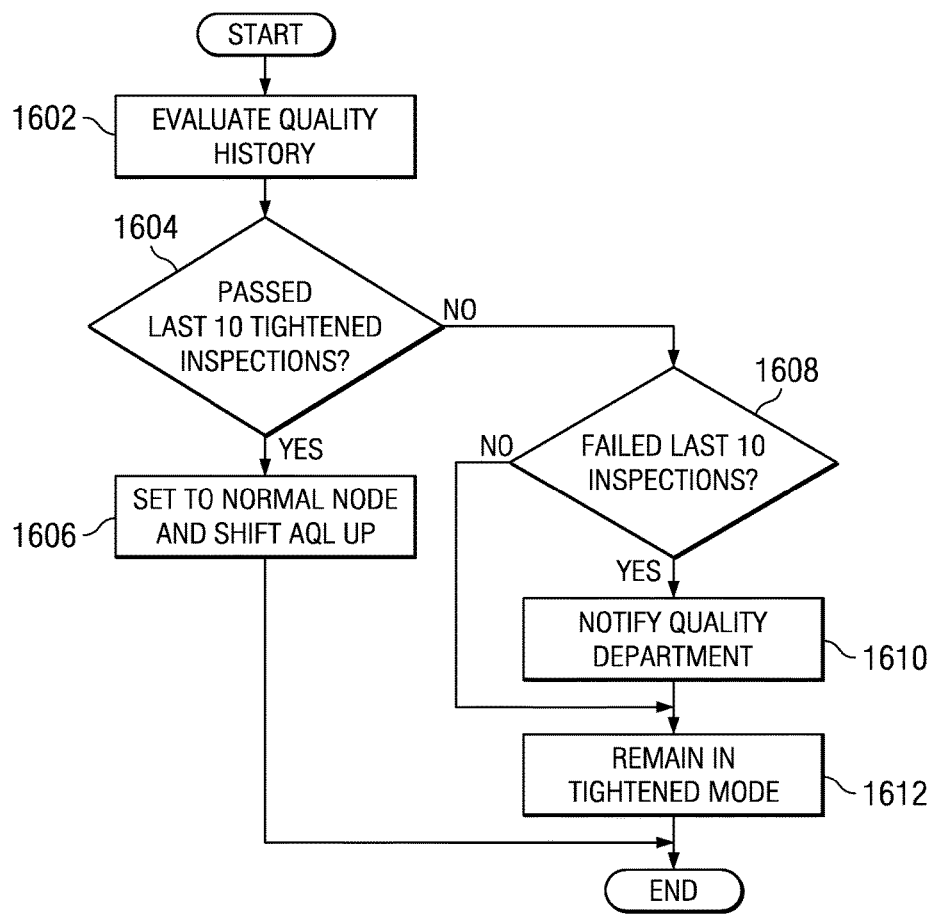
FIG. 16 is a flowchart of a process for a tightened inspection level in accordance with an advantageous embodiment.

FIG. 16 is a flowchart of a process for a tightened inspection level in accordance with an advantageous embodiment. The process in FIG. 16 may be implemented by software for managing inspection of items ordered and received, such as, without limitation, inspection controller 304 in FIG. 3.

The process begins by evaluating the quality history of the item received (operation 1602). A determination is made as to whether the last 10 tightened inspections passed (operation 1604). If the last 10 inspections did pass, the inspection level is changed from tightened mode to a normal mode and the acceptable quality level is shifted up (operation 1606). An inspection is then recommended in accordance with the normal mode with the process terminating thereafter.

Returning to operation 1604, if the last 10 tightened inspections did not pass, a determination is made as to whether the last 10 tightened inspections failed (operation 1608). If the last 10 inspections did fail, a notification is sent to a quality control department (operation 1610). After notifying a quality control department in operation 1610 or if the last 10 inspections did not all fail at step 1608, the inspection level remains in tightened mode (operation 1612) with the process terminating thereafter.

The illustrative embodiments provide a computer implemented method, apparatus, and computer usable program code for managing inspection of items. In one embodiment, an identifier and receipt date for an item is received in a shipment of items from a supplier to form item received data. Inspection criteria for inspecting the shipment of items from the supplier is adjusted using a quality history for similar items received from the supplier. The quality history is data regarding results of inspections of the similar items. A result of the inspection is received. The quality history for similar items received from the supplier is updated with the result of the inspection.

Thus, the illustrative embodiments provide a process for receiving and inspection of good ordered and inventoried using an inventory management system. The process adjusts sampling sizes for incoming shipments using previous quality data to build a history that influences current inspection levels, while also functioning as a nonconformance and corrective action tracking system.

The embodiments may be easily used by anyone using an off the shelf inventory management system, such as, without limitation, CribMaster Inventory Management System®. The embodiments may be used by an integrated supplier, used for nonconforming material disposition, and/or used to track corrective action taken in regard to non-conforming items.

In this manner, the illustrative embodiments can provide quality tools and other items at the shop floor, reduce the time tools and other items are held in inspection to shorten lead times and reduce costs. Cost savings may be increased by utilization of the inventory management system of the illustrative embodiments in an enterprise system. In addition, users are provided with near instantaneous feedback on quality related issues. This allows suppliers to correct processes on a continuing basis to reduce the number of rejected, reworked, and returned items. Monitoring quality history will also allow users to appropriately adjust the user's supply chain of approved suppliers to the most capable suppliers.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The description of the disclosure has been presented for purposes of illustration and description, and is not intended to be exhaustive or limited to the invention in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the invention, the practical application, and to enable others of ordinary skill in the art to understand the invention for various embodiments with various modifications as are suited to the particular use contemplated.

What is claimed is:

1. A method comprising:
   automated management of inspection of items using past supplier performance and product quality history to determine an inspection level and an inspection sample size by a computer system:
   receiving an identifier for an item in a shipment of items to form item received data;
   outputting inspection criteria for the item;
   retrieving a quality history for the item from an inventory management database, wherein the quality history is data regarding results of inspections of a similar item received;
   automatically adjusting inspection criteria for inspecting the shipment of items using the quality history to form adjusted inspection criteria, wherein the adjusted inspection criteria includes the inspection level and the inspection sample size, wherein the inspection level includes at least one of skip inspection, normal inspection, and tightened inspection;
   receiving an inspection result from inspection of the item, wherein the inspection of the item is performed with the adjusted inspection criteria;
   determining, based on the inspection result, whether the item is a conforming item or a non-conforming item;
   responsive to the item being a conforming item, ordering that the item be delivered; and
   responsive to the item being a non-conforming item, taking an action selected from the group consisting of: ordering that the item is to be delivered, ordering that the item is to be returned, ordering that the item is to be re-worked, and ordering that the item is to be scrapped.

2. The method of claim 1 wherein the inspection result indicates a set of nonconforming items in the shipment of items, and further comprising the computer system:
   notifying appropriate personnel of the set of nonconforming items using predetermined roles to identify the appropriate personnel.

3. The method of claim 1 wherein the inspection result indicates a set of nonconforming items in the shipment of items, and further comprising the computer system:
   accepting instructions for dealing with the set of nonconforming items.

4. The method of claim 1 wherein the inspection result indicates a set of nonconforming items in the shipment of items, and further comprising the computer system:
   receiving a disposition for the set of nonconforming items, wherein the disposition indicates that the set of nonconforming items are to be returned to a supplier of the set of nonconforming items for corrective action; and
   sending a notification of nonconformance to the supplier of the set of nonconforming items, wherein the notification of nonconformance comprises a notification to the supplier of a return of the set of nonconforming items and a request for the corrective action.

5. The method of claim 1 wherein the inspection result indicates a set of nonconforming items in the shipment of items, and further comprising the computer system:
   receiving a disposition for the set of nonconforming items, wherein the disposition indicates that the set of nonconforming items are to be reworked.

6. The method of claim 1 wherein the inspection sample size includes at least one of a full inspection, a sample inspection, or no inspection, wherein the full inspection indicates that all items in the shipment of items should be inspected, and wherein the sample inspection indicates that only a selected number of items in the shipment of items should be inspected.

7. A computer program product comprising:
   a computer-readable, non-transitory storage medium including program code for automated management of inspection of items using past supplier performance and product quality history to determine an inspection level and an inspection sample size, said computer program product comprising:
   first program code for receiving an identifier for an item in a shipment of items to form received item data;
   second program code for retrieving a quality history for a received item, wherein the quality history is data regarding results of inspections of items received;
   third program code for outputting inspection criteria for the received item;
   fourth program code for automatically adjusting inspection criteria for inspecting the shipment of items using the quality history to form adjusted inspection criteria, wherein the adjusted inspection criteria include the inspection level and the inspection sample size, wherein the inspection level includes at least one of skip inspection, normal inspection, and tightened inspection;

fifth program code for receiving an inspection result for the item, wherein the inspection result is for an inspection using the adjusted inspection criteria;

sixth program code for determining, based on the inspection result, whether the item is a conforming item or a non-conforming item;

seventh program code for, responsive to the item being a conforming item, ordering that the item be delivered; and eighth program code for, responsive to the item being a non-conforming item, taking an action selected from the group consisting of: ordering that the item is to be delivered, ordering that the item is to be returned, ordering that the item is to be re-worked, and ordering that the item is to be scrapped.

8. The computer program product of claim 7 wherein the inspection result indicates a set of nonconforming items in the shipment of items, and the computer program product further comprises:

ninth program code for notifying appropriate personnel of the set of nonconforming items using predetermined roles in a system to identify the appropriate personnel.

9. The computer program product of claim 7 wherein the inspection result indicates a set of nonconforming items in the shipment of items, and the computer program product further comprises:

ninth program code for accepting instructions for dealing with the set of nonconforming items.

10. The computer program product of claim 7 wherein the inspection result indicates a set of nonconforming items in the shipment of items, and the computer program product further comprises:

ninth program code for receiving a disposition for the set of nonconforming items, wherein the disposition indicates that the set of nonconforming items are to be returned to a supplier of the shipment of items for corrective action; and tenth program code for sending a notification of nonconformance to the supplier, wherein the notification of nonconformance comprises a notification to the supplier of a return of the set of nonconforming items and a request for the corrective action.

11. The computer program product of claim 7, wherein the computer program product further comprises:

ninth program code for updating the quality history for items received to form an updated quality history, wherein the received item is a first item and the shipment of items is a first shipment;

tenth program code for receiving an identifier for a second item in a second shipment of items;

eleventh program code for adjusting inspection criteria for inspecting the second shipment of items using the updated quality history;

twelfth program code for receiving a second inspection result of the second shipment of items; and thirteenth program code for updating the updated quality history with the second inspection result.

12. The computer program product of claim 7 wherein the inspection sample size includes at least one of a full inspection, a sample inspection, or no inspection, wherein the full inspection indicates that all items in the shipment of items should be inspected, and wherein the sample inspection indicates that only a selected number of items in the shipment of items should be inspected.

13. A system comprising:

a computer having at least one processor unit; and an inventory management system for automated management of inspection of items using past supplier performance and product quality history to determine an inspection level and an inspection sample size, wherein the inventory management system is configured to cause the at least one processor unit to:

receive an identifier for a received item in a shipment of items to form item received data;

output inspection criteria for the received item;

retrieve a quality history for the received item, wherein the quality history is data regarding results of inspections of a similar item received; and receive an inspection result formed upon inspection of the received item using adjusted inspection criteria, wherein the processor unit is configured to automatically adjust inspection criteria for inspecting the shipment of items using the quality history to form the adjusted inspection criteria, wherein the adjusted inspection criteria includes the inspection level and the inspection sample size, and wherein the inspection level includes at least one of skip inspection, normal inspection, and tightened inspection;

determine, based on the inspection result, whether the received item is a conforming item or a non-conforming item;

order, responsive to the received item being a conforming item, that the received item be delivered; and take an action, responsive to the received item being a non-conforming item, the action selected from the group consisting of: ordering that the received item is to be delivered, ordering that the received item is to be returned, ordering that the received item is to be re-worked, and ordering that the received item is to be scrapped.

14. The system of claim 13, wherein the inspection result indicates a set of nonconforming items in the shipment of items and wherein the at least one processor unit is further configured to notify appropriate personnel of the set of nonconforming items using predetermined roles to identify the appropriate personnel.

15. The system of claim 13, wherein the inspection result indicates a set of nonconforming items in the shipment of items and wherein the at least one processor unit is further configured to accept instructions for dealing with the set of nonconforming items.

16. The system of claim 13, wherein the inspection result indicates a set of nonconforming items in the shipment of items, and wherein the at least one processor unit is further configured to:

receive a disposition for the set of nonconforming items, wherein the disposition indicates that the set of nonconforming items are to be returned to a supplier of the set of nonconforming items for corrective action; and send a notification of nonconformance to the supplier of the set of nonconforming items, wherein the notification of nonconformance comprises a notification to the supplier of a return of the set of nonconforming items and a request for the corrective action.

17. The system of claim 13, wherein the inspection result indicates a set of nonconforming items in the shipment of items, and wherein the at least one processor unit is further configured to receive a disposition for the set of nonconforming items, wherein the disposition indicates that the set of nonconforming items are to be reworked.

18. The system of claim 13, wherein the received item is a first item and the shipment of items is a first shipment, and wherein updating the quality history for items received forms an updated quality history, and wherein the at least one processor unit is further configured to:
 receive an identifier for a second item in a second shipment of items;
 adjust inspection criteria for inspecting the second shipment of items using the updated quality history;
 receive a second inspection result of the second shipments of items; and
 update the updated quality history with the second inspection result.

19. The system of claim 13, wherein the inspection sample size includes at least one of a full inspection, a sample inspection, or no inspection, wherein the full inspection indicates that all items in the shipment of items should be inspected, and wherein the sample inspection indicates that only a selected number of items in the shipment of items should be inspected.

20. The method of claim 1, further comprising the computer system:
 receiving the inspection result; and
 updating the quality history for a received item using the inspection result to form an updated quality history.

21. The method of claim 20 wherein the received item is a first item and the shipment of items is a first shipment, and further comprising the computer system:
 receiving an identifier for a second item in a second shipment of items;
 adjusting inspection criteria for inspecting the second shipment of items using the updated quality history;
 receiving a second inspection result of the second shipments of items; and
 updating the updated quality history with the second inspection result.

22. The computer program product of claim 7 further comprising:
 computer usable program code for receiving an inspection result; and
 computer usable program code for updating the quality history for the received item using the inspection result.

23. The system of claim 13 wherein:
 the processor unit is configured to receive the inspection result; and
 the processor unit is configured to update the quality history for the received item using the inspection result.

* * * * *